US012649343B2

(12) United States Patent
Nishide et al.

(10) Patent No.: US 12,649,343 B2
(45) Date of Patent: Jun. 9, 2026

(54) SUSPENSION CONTROL APPARATUS AND SUSPENSION CONTROL METHOD

(71) Applicant: THK CO., LTD., Tokyo (JP)

(72) Inventors: Tetsuhiro Nishide, Tokyo (JP); Hiroshi Kaneshige, Tokyo (JP); Toshiro Minami, Tokyo (JP); Junichi Tanifuji, Tokyo (JP); Takao Miyoshi, Tokyo (JP); Arina Soga, Tokyo (JP); Masaki Nagaura, Tokyo (JP); Shinobu Kamada, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 18/857,733

(22) PCT Filed: Apr. 14, 2023

(86) PCT No.: PCT/JP2023/015190
§ 371 (c)(1),
(2) Date: Oct. 17, 2024

(87) PCT Pub. No.: WO2023/204154
PCT Pub. Date: Oct. 26, 2023

(65) Prior Publication Data
US 2025/0346084 A1     Nov. 13, 2025

(30) Foreign Application Priority Data
Apr. 20, 2022     (JP) ................................. 2022-069714

(51) Int. Cl.
*B60G 17/015*     (2006.01)
*B60G 17/019*     (2006.01)
*B60G 17/08*     (2006.01)

(52) U.S. Cl.
CPC ... *B60G 17/0157* (2013.01); *B60G 17/01908* (2013.01); *B60G 17/08* (2013.01);
(Continued)

(58) Field of Classification Search
CPC .............. B60G 17/01908; B60G 17/08; B60G 2202/30; B60G 2202/42; B60G 2400/821
(Continued)

(56) References Cited

U.S. PATENT DOCUMENTS 7,168,709 B2 * 1/2007 Niwa ................. B60G 17/0165
701/1
10,696,227 B2 * 6/2020 Stein ...................... G06V 20/56
(Continued)

FOREIGN PATENT DOCUMENTS

| JP | 2007-203933 A | 8/2007 |
| JP | 2011-143770 A | 7/2011 |
| WO | 2020/158314 A | 8/2020 |

OTHER PUBLICATIONS

International Search Report dated Jun. 27, 2023, issued in counterpart International Application No. PCT/JP2023/015190. (2 pages).
(Continued)

*Primary Examiner* — Paul N Dickson
*Assistant Examiner* — Tiffany L Webb
(74) *Attorney, Agent, or Firm* — WHDA, LLP

(57) ABSTRACT

A suspension control apparatus controls a suspension device to be attached to wheels of a movable body. The suspension device includes an active suspension capable of adjusting a vehicle height, and a damper capable of adjusting a damping force. The suspension control apparatus includes a road surface shape measurement device that obtains a road surface shape, an actuator control device that controls driving of the suspension device, and an actuator drive selection device that changes driving of the suspension device based on information obtained by the road surface shape measurement device. The suspension control apparatus and a suspension control method suppress road surface vibration transmitted to a vehicle body and reduces power consump-
(Continued)

tion by estimating the road surface shape in front of the vehicle.

8 Claims, 8 Drawing Sheets

(52) U.S. Cl.
CPC ...... *B60G 2202/12* (2013.01); *B60G 2202/24* (2013.01); *B60G 2202/30* (2013.01); *B60G 2202/42* (2013.01); *B60G 2400/821* (2013.01); *B60G 2400/91* (2013.01)

(58) Field of Classification Search
USPC .......................................................... 701/37
See application file for complete search history.

(56) References Cited

U.S. PATENT DOCUMENTS

| | | | | |
|---|---|---|---|---|
| 11,912,090 B2* | 2/2024 | Furuta | ................ | B60G 17/0165 |
| 12,162,322 B2* | 12/2024 | Hirao | .................... | B60G 17/06 |
| 12,252,111 B2* | 3/2025 | Noma | .................... | B60W 10/04 |
| 2014/0297119 A1 | 10/2014 | Giovanardi et al. | | |
| 2021/0031585 A1 | 2/2021 | Toyohira | | |
| 2021/0402841 A1 | 12/2021 | Furuta | | |
| 2022/0097473 A1* | 3/2022 | Kasuya | .............. | B60G 17/0182 |
| 2025/0091584 A1* | 3/2025 | Kim | ....................... | B60G 17/06 |

OTHER PUBLICATIONS

Office Action dated Feb. 10, 2026, issued in counterpart JP Application No. 2022-069714, with English translation. (6 pages).
Extended (Supplementary) European Search Report dated Apr. 14, 2026, issued in counterpart EP Application No. 23791802.4. (9 pages).

* cited by examiner

FIG. 3

SUSPENSION CONTROL APPARATUS AND SUSPENSION CONTROL METHOD

TECHNICAL FIELD

The present invention relates to a suspension control apparatus and a suspension control method that control a suspension device to be attached to wheels of an automobile and the like.

BACKGROUND ART

Conventionally, vehicles are known that are provided with a suspension device combining an active suspension capable of driving an electromagnetic actuator to change the vehicle height, and a damper capable of suppressing high frequency oscillation. Various structures for such a suspension device are known, and for example, as illustrated in Patent Literature 1, there is known a suspension device including: a support device that is provided between wheels and a vehicle body so as to be expandable and contractible in an up-down direction within a predetermined stroke range to elastically support the weight of a vehicle; an electromagnetic actuator that receives a force of the wheels in the up-down direction and complements the support by the support device; and an actuator control device that controls energization of the electromagnetic actuator, wherein the suspension device includes an end position detection device that detects that the stroke position of the support device is in the vicinity of the end of the expandable and contractible stroke range thereof; when the end position detection device detects that the stroke position of the support device is in the vicinity of the end, the actuator control device changes a control mode of the electromagnetic actuator; the electromagnetic actuator is constituted by a thread device including an external thread member and an internal thread member that are engaged with each other, and a motor that rotates the external thread member or the internal thread member of the thread device to drive the thread device to be expanded and contracted; and the suspension device connects at least one of the thread device or the motor to the wheels or the vehicle body via the damper device for elastically supporting therefor.

According to such a suspension device, when the support device and the damper device each approach a stopper that regulates vertical stroke, the energization control to the electromagnetic actuator can be changed so that the support device and the damper device cannot easily approach the stopper. As a result, since the damper device removes high frequency vibration from a road surface, and the shock caused by hitting the stopper is suppressed, the ride comfort for passengers can be improved.

CITATION LIST

Patent Literature

Patent Literature 1: Japanese Patent Laid-Open No. 2007-203933

SUMMARY OF INVENTION

Technical Problem

However, since conventional suspension devices use an active suspension and a damper at the same time without distinguishing between road vibration and step height, there has been a problem in that the active suspension is driven even for slight vibration, and the power consumption is increased.

In addition, since a response delay occurs in the driving of the active suspension when removing high frequency vibration from a road surface, there has been a problem in that the burden of control by the damper is increased, and the oscillating suppression performance is deteriorated.

The present invention has been made to solve the above-described problems, and an object of the present invention is to provide a suspension control apparatus and a suspension control method that can appropriately suppress road surface vibration transmitted to a vehicle body during traveling, and can reduce power consumption by estimating the road surface shape in front of a vehicle, and changing driving of an active suspension and a damper based on this information.

Solution to Problem

A suspension control apparatus according to the present invention that solves the above-described problems is a suspension control apparatus that controls a suspension device to be attached to wheels of a movable body, the suspension device consisting of an active suspension capable of adjusting a vehicle height, and a damper capable of adjusting a damping force, the suspension control apparatus including a road surface shape measurement device that obtains a road surface shape, an actuator control device that controls driving of the suspension device, and an actuator drive selection device that changes driving of the suspension device based on information obtained by the road surface shape measurement device.

In addition, a suspension control method according to the present invention that solves the above-described problems is a suspension control method that controls a suspension device to be attached to wheels of a movable body, the suspension device consisting of an active suspension capable of adjusting a vehicle height, and a damper capable of adjusting a damping force, the suspension control method including a road surface shape measurement step of obtaining a road surface shape, an actuator control step of controlling driving of the suspension device, and an actuator drive selection step of changing driving of the suspension device based on information obtained by the road surface shape measurement step.

Advantageous Effects of Invention

According to the suspension control apparatus and the suspension control method according to the present invention, road surface vibration transmitted to a vehicle body during traveling can be appropriately suppressed by measuring the road surface shape in front of a vehicle, estimating the frequency and height of a step, and by selecting driving of either one of the active suspension or the damper, or combining and driving both by changing the ratio of control force, based on these pieces of information. In addition, in this manner, by driving either one of the active suspension or the damper or a combination of both according to need, the power consumption can be reduced.

BRIEF DESCRIPTION OF DRAWINGS

FIG. 3 is a block diagram illustrating the configuration of the suspension control apparatus according to the embodiment of the present invention.

DESCRIPTION OF EMBODIMENTS

Hereinafter, embodiments of a suspension control apparatus according to the present invention will be described with reference to the drawings. Note that the following embodiments do not limit the invention according to each claim, and not all the combinations of features described in the embodiments are necessarily essential to the solutions of the invention.

Figure 1:
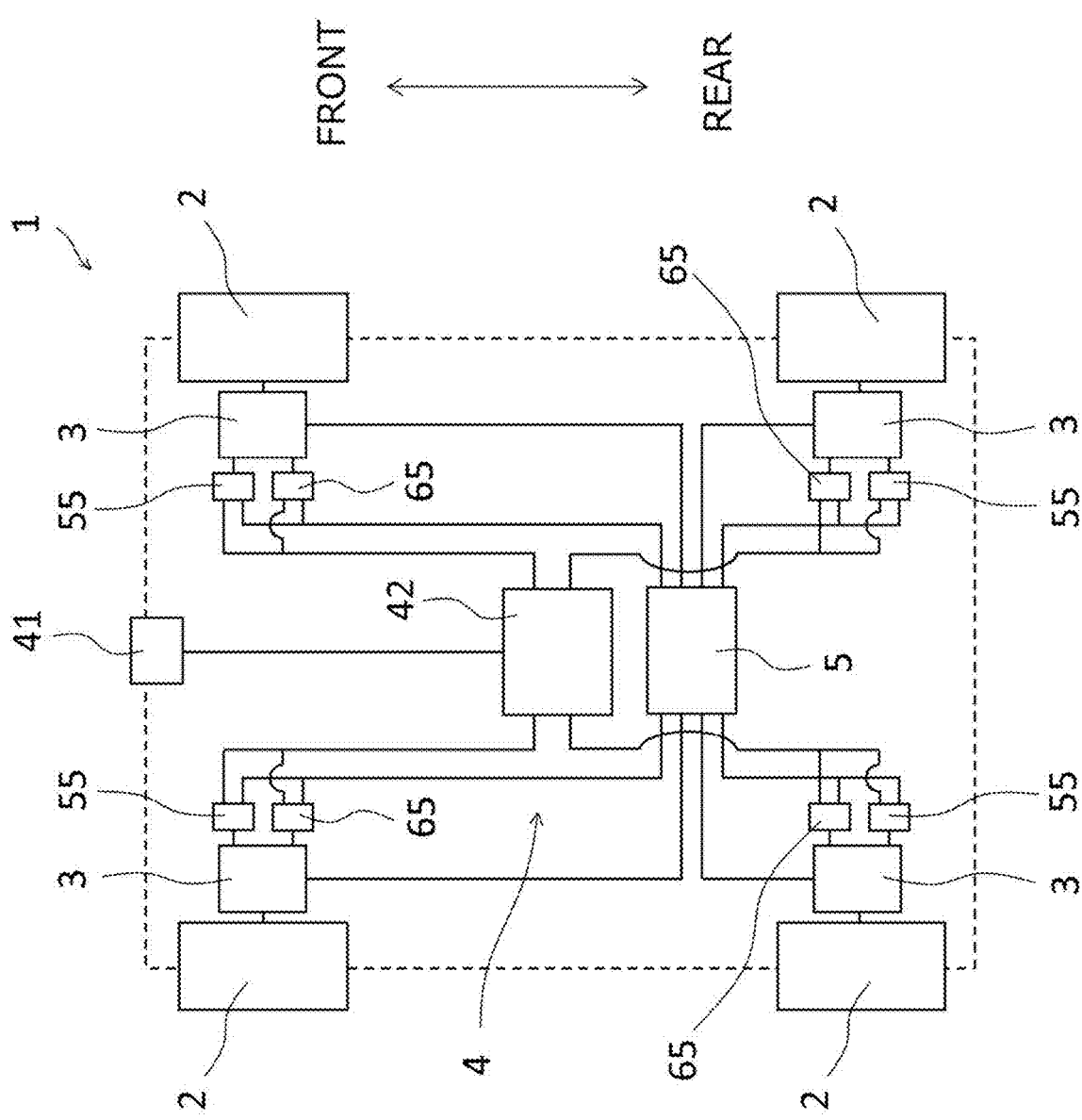
FIG. 1 is a schematic diagram of a vehicle including a suspension control apparatus according to an embodiment of the present invention.
Figure 2:
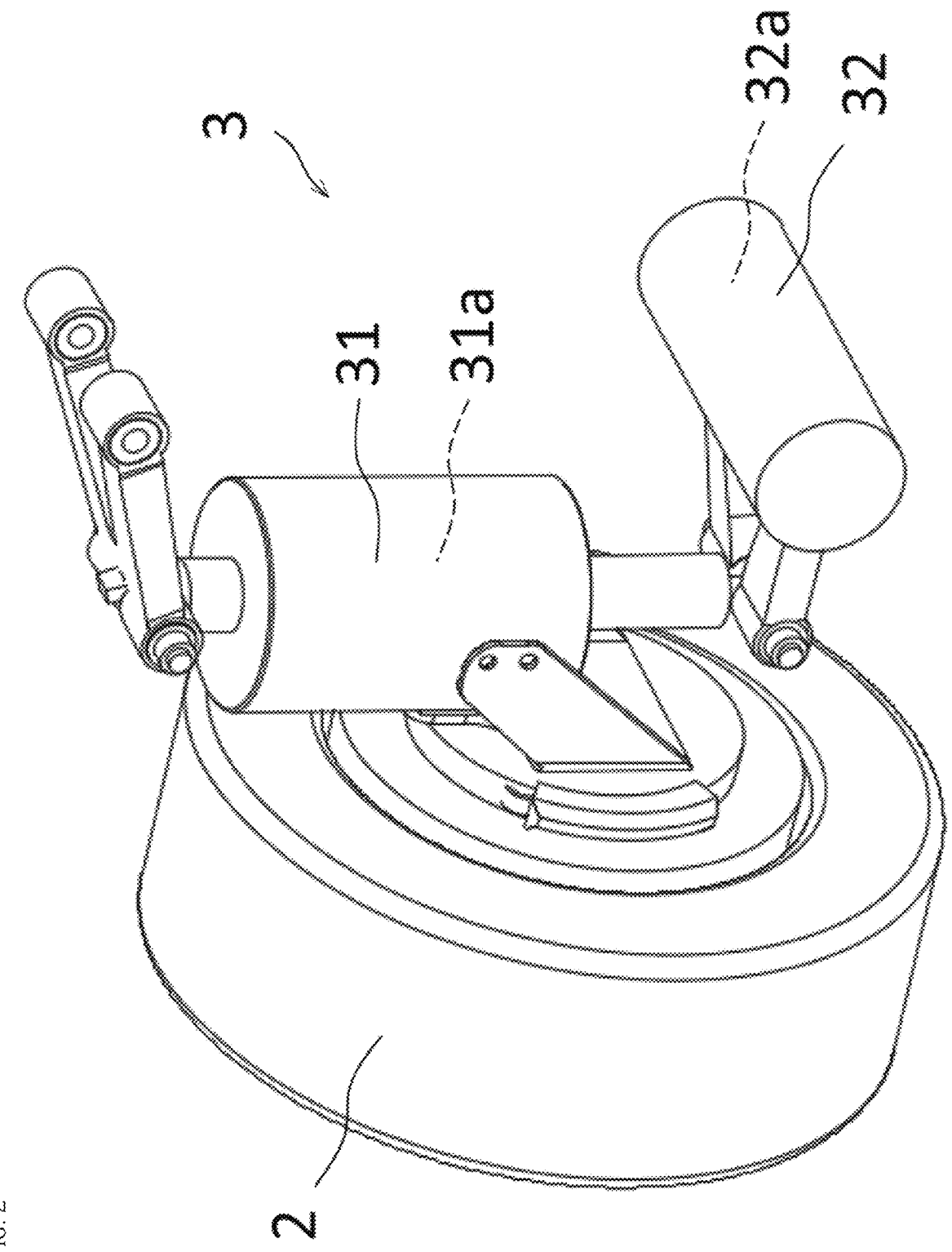
FIG. 2 is a schematic diagram for describing the suspension device according to the embodiment of the present invention.
Figure 3:
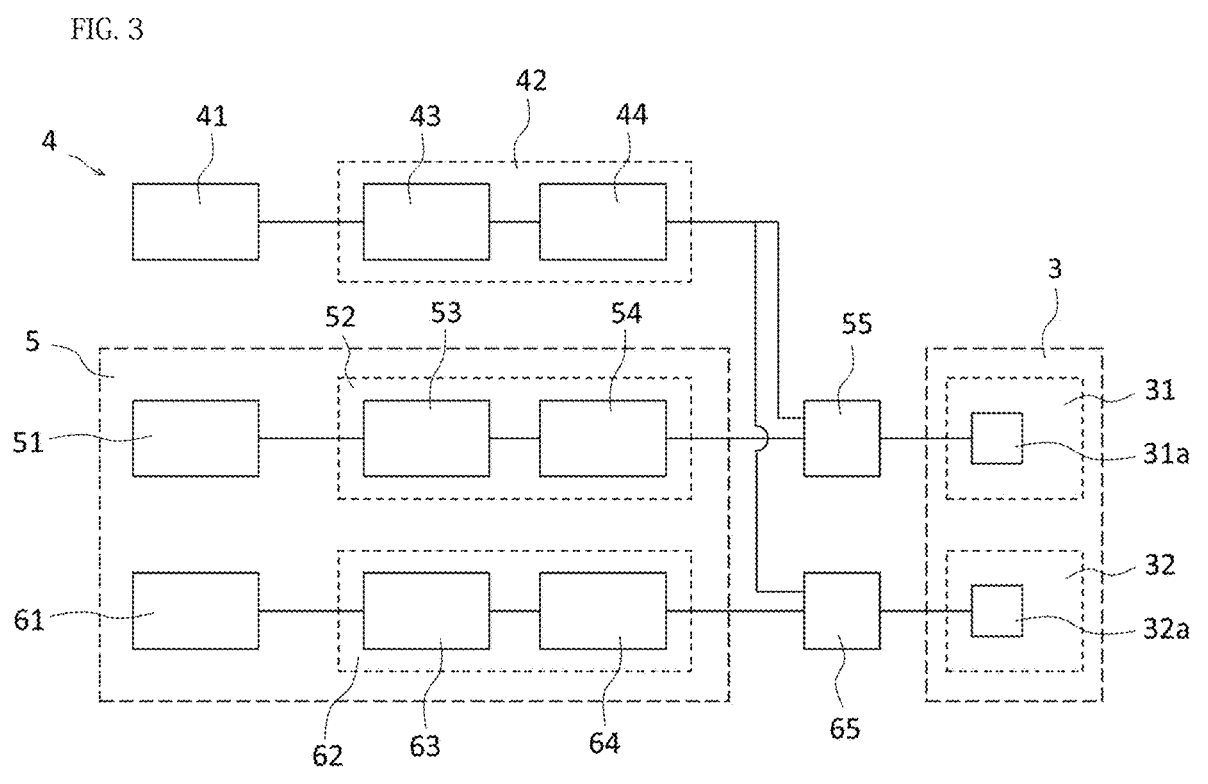

FIG. 1 is a schematic diagram of a vehicle including a suspension control apparatus according to an embodiment of the present invention, FIG. 2 is a schematic diagram for describing a suspension device according to the embodiment of the present invention, and FIG. 3 is a block diagram illustrating the configuration of the suspension control apparatus according to the embodiment of the present invention.

As illustrated in FIG. 1, a vehicle 1 provided with the suspension control apparatus according to the present embodiment includes wheels 2 arranged at the four corners, i.e., front, rear, left, and right corners, of the vehicle 1, and suspension devices 3. The wheels 2 are attached to a vehicle body via suspension arms so as to be movable up and down.

As illustrated in FIG. 2, the suspension device 3 is attached between each of the wheels 2 and the vehicle body, softens vibration and shock that are input from a road surface, maintains the orientation of the vehicle body, and secures driving stability. The suspension device 3 includes an active suspension 31 and a damper 32.

The active suspension 31 includes a spring that is a compression coil spring, and a vehicle height adjustment actuator 31*a* that suppresses movement of the oscillating spring and that can adjust the height of the vehicle body from the ground.

The spring supports the vehicle weight, and determines the amount of inclination of the vehicle body in front, rear, left, and right that occurs during traveling by the stiffness of the spring. The spring expands and contracts according to the unevenness of a road surface, and maintains the wheel 2 so that the wheel 2 is not separated from the road surface. Note that, although the spring has been described as the compression coil spring, the spring is not limited to this, and may be a torsion bar.

The vehicle height adjustment actuator 31*a* includes, for example, a ball screw mechanism in which a ball screw and a ball screw nut are screwed together, and generates the damping force from the resistance force of a motor that generates electricity through the up and down expansion and contraction movement of the ball screw mechanism. In addition, the damping force can be adjusted by the driving force of the ball screw mechanism that is expanded and contracted up and down when the motor is energized. In addition, by driving the motor in this manner, and expanding and contracting the ball screw mechanism up and down, so as to expand and contract the entire length of the active suspension 31 to change the interval between the wheel 2 and the vehicle body, the height of the vehicle body from the ground can be adjusted.

According to the active suspension 31 as described above, even when a road surface has unevenness with high step height, the orientation of the vehicle body can be maintained by changing the interval between the wheels 2 and the vehicle body.

On the other hand, since the active suspension 31 as described above causes the motor to function by the up-and-down expansion and contraction operation of the ball screw mechanism, when the vibration due to unevenness of a road surface received by the wheels 2 during traveling is high frequency, a response delay occurs. In addition, when the active suspension 31 performs vehicle height adjustment, since the ball screw mechanism is expanded and contracted up and down by the torque of the motor, the power consumption is increased.

The damper 32 is a rotary damper that utilizes the damping force generated by magnetorheological resistance. The damper 32 includes a variable damper actuator 32*a* capable of adjusting the damping force by current control.

The variable damper actuator 32*a* is held by a bearing or the like so that a rotation axis can rotate with respect to a body case, for example. A coil and a rotor are housed in the body case, and the rotation axis is attached to the rotor. There is a gap around the rotor, and this gap is filled with magnetic fluid. When current is passed through the coil of the variable damper actuator 32*a* as described above, the viscous resistance of the filled magnetic fluid is increased, and a force is generated that prevents the rotor from rotating. By controlling the current that is input into the coil in this manner, the variable damper actuator 32*a* can adjust the damping force of the damper 32.

According to the damper 32 as described above, since the damping force can be electrically caused, excellent responsiveness is provided, and the vibration of the vehicle body can be suppressed even when there are steps with high frequency on the road surface during traveling. In addition, since the viscous resistance of the magnetic fluid can be steplessly adjusted, it is possible to perform control so that the current is minimized in order to generate the required torque, and the power consumption can be reduced.

On the other hand, compared with the active suspension 31, the damper 32 as described above has a short adjustment distance for changing the interval between the wheel 2 and the vehicle body, and the step height of a road surface that can be corresponded becomes low.

Note that, although the damper 32 has been described as the damper capable of adjusting the damping force by current control, the structure of the damper 32 is not limited to this, and the damper 32 may be a damper with constant damping force. In addition, although the damper 32 has been described as the rotary damper that utilizes the damping force generated by the viscous resistance of the magnetic fluid, the damper 32 is not limited to this, and may be a damper that utilizes the damping force generated by the viscous resistance of oil. In addition, the damper 32 may be a cylinder type damper.

Next, a suspension control apparatus 4 according to the present embodiment will be described. As illustrated in FIGS. 1 and 3, the suspension control apparatus 4 includes a front sensor 41 (a road surface shape measurement device in the claims), an actuator drive selection device 42 (an actuator drive selection device in the claims), and an actuator control device 5 (an actuator control device in the claims).

The front sensor 41 is mounted on, for example, a front surface of the vehicle, and obtains the step height and step frequency of the unevenness of a road surface in front of the vehicle. As the front sensor 41, for example, a camera or a radar-type sensor is used. Note that the mounting position of the front sensor 41 is not limited to the front surface of the vehicle, and as long as the road surface in front of the vehicle can be measured, the front sensor 41 may be mounted on a lower portion of the vehicle, or around a windshield.

The actuator drive selection device 42 changes the driving method of the suspension device 3 based on the information obtained by the front sensor 41. The actuator drive selection device 42 includes a microprocessor that is a control device, and is actuated by power supply from a battery, which is not illustrated. The actuator drive selection device 42 includes a road surface shape estimation unit 43 and a control selection unit 44.

The road surface shape estimation unit 43 estimates, based on the information on the road surface shape in front of the vehicle obtained by the front sensor 41, the step height and step frequency of the unevenness of a road surface located directly below the wheels 2 at the time when the wheels 2 pass it during travelling.

The control selection unit 44 calculates the control force of the suspension device 3 that is required for maintaining the orientation of the vehicle body, based on the information estimated by the road surface shape estimation unit 43. Based on the required control force of the suspension device 3, the control selection unit 44 determines the method of driving for the vehicle height adjustment actuator 31*a* and the variable damper actuator 32*a*, and sends a signal to changeover switches 55 and 65, which will be described later.

In this manner, the actuator drive selection device 42 estimates in advance the road surface shape at the time when the wheels 2 passes during traveling, based on the information on the road surface shape in front of the vehicle, and controls the driving of the active suspension 31 or the driving of the damper 32 according to the road surface shape.

The actuator control device 5 includes a lower spring sensor 51 (a road surface frequency measurement device in the claims), a vehicle height adjustment actuator control unit 52, an upper spring sensor 61 (an orientation information obtaining device in the claims), and a variable damper actuator control unit 62.

The lower spring sensor 51 measures the vibration received from a road surface which the wheels 2 pass, and transmits a signal to the vehicle height adjustment actuator control unit 52. The lower spring sensor 51 is an acceleration sensor mounted between the active suspension 31 and the wheel 2, and is mounted corresponding to each of the wheels 2 arranged at the four corners of the vehicle 1.

The vehicle height adjustment actuator control unit 52 includes a microprocessor that is a control device, and is actuated by power supply from a battery, which is not illustrated. The vehicle height adjustment actuator control unit 52 includes a road surface unevenness calculation unit 53 and a target vehicle height calculation unit 54.

The road surface unevenness calculation unit 53 calculates the step height and step frequency of the unevenness of an actual road surface located directly below the wheels 2 based on the information obtained by the lower spring sensor 51.

The target vehicle height calculation unit 54 calculates the amount of expansion and contraction of the active suspension 31 required for maintaining the orientation of the vehicle body, based on the information calculated by the road surface unevenness calculation unit 53, and transmits a signal to the vehicle height adjustment actuator 31*a*.

The target vehicle height calculation unit 54 and the vehicle height adjustment actuator 31*a* are connected via the changeover switch 55. The changeover switch 55 controls the signal that is input into the vehicle height adjustment actuator 31*a*, based on the signal from the control selection unit 44.

The changeover switch 55 connects the signal transmitted from the target vehicle height calculation unit 54 to the vehicle height adjustment actuator 31*a*, and drives the vehicle height adjustment actuator 31*a* so as to expand and contract the entire length of the active suspension 31 according to the amount of expansion and contraction calculated by the target vehicle height calculation unit 54. Alternatively, the changeover switch 55 disconnects the signal transmitted from the target vehicle height calculation unit 54, and fixes the operation of the vehicle height adjustment actuator 31*a* so that the entire length of the active suspension 31 is not changed. Note that, as a method of fixing the operation of the vehicle height adjustment actuator 31*a*, for example, a solenoid ON/OFF valve may be driven by the changeover switch 55, and the ball screw mechanism of the vehicle height adjustment actuator 31*a* may be mechanically locked.

Note that, although the case has been described where the changeover switch 55 connects or disconnects the signal transmitted from the target vehicle height calculation unit 54, the changeover switch 55 is not limited to this, and the changeover switch 55 may change the signal transmitted from the target vehicle height calculation unit 54 based on the information sent from the control selection unit 44, and may steplessly change the amount of expansion and contraction or the damping force of the active suspension 31 by the vehicle height adjustment actuator 31*a*.

The upper spring sensor 61 measures the up-and-down acceleration during travelling, and transmits a signal to the variable damper actuator control unit 62. The upper spring sensor 61 is an acceleration sensor mounted between the active suspension 31 and the vehicle body, and is mounted corresponding to a vehicle body portion directly above each of the wheels 2 arranged at the four corners of the vehicle 1.

The variable damper actuator control unit 62 includes a microprocessor that is a control device, and is actuated by power supply from a battery, which is not illustrated. The variable damper actuator control unit 62 includes a vehicle body orientation calculation unit 63 and a damping force calculation unit 64.

The vehicle body orientation calculation unit 63 calculates, based on the information obtained by the upper spring sensor 61, the actual orientation of the vehicle body, as well as the up-and-down speed, the up-and-down movement distance behavior, and the like obtained by integrating the up-and-down acceleration of the four corners of the vehicle body, and transmits a signal to the damping force calculation unit 64.

The damping force calculation unit 64 calculates the damping force of the damper 32 required for stabilizing the orientation of the vehicle body, based on the information calculated by the vehicle body orientation calculation unit 63, and transmits a signal to the variable damper actuator 32a.

The damping force calculation unit 64 and the variable damper actuator 32a are connected via the changeover switch 65. The changeover switch 65 controls the signal that is input into the variable damper actuator 32a, based on the signal from the control selection unit 44.

The changeover switch 65 connects the signal transmitted from the damping force calculation unit 64 to the variable damper actuator 32a, and changes the damping force of the variable damper actuator 32a according to the damping force calculated by the damping force calculation unit 64. Alternatively, the changeover switch 65 disconnects the signal transmitted from the damping force calculation unit 64, and fixes the damping force of the variable damper actuator 32a to be an arbitrary value.

Note that, although the case has been described where the changeover switch 65 connects or disconnects the signal transmitted from the damping force calculation unit 64, the changeover switch 65 is not limited to this, and the changeover switch 65 may change the signal transmitted from the damping force calculation unit 64, based on the information sent from the control selection unit 44, and may steplessly change the damping force of the damper 32 by the variable damper actuator 32a.

Next, based on the following examples, a description will be given of a method of determining the switching of driving between the vehicle height adjustment actuator 31a and the variable damper actuator 32a by the actuator drive selection device 42, or a method of determining the ratio of driving both, in the suspension control apparatus 4 according to the present embodiment.

First Example

Figure 4:
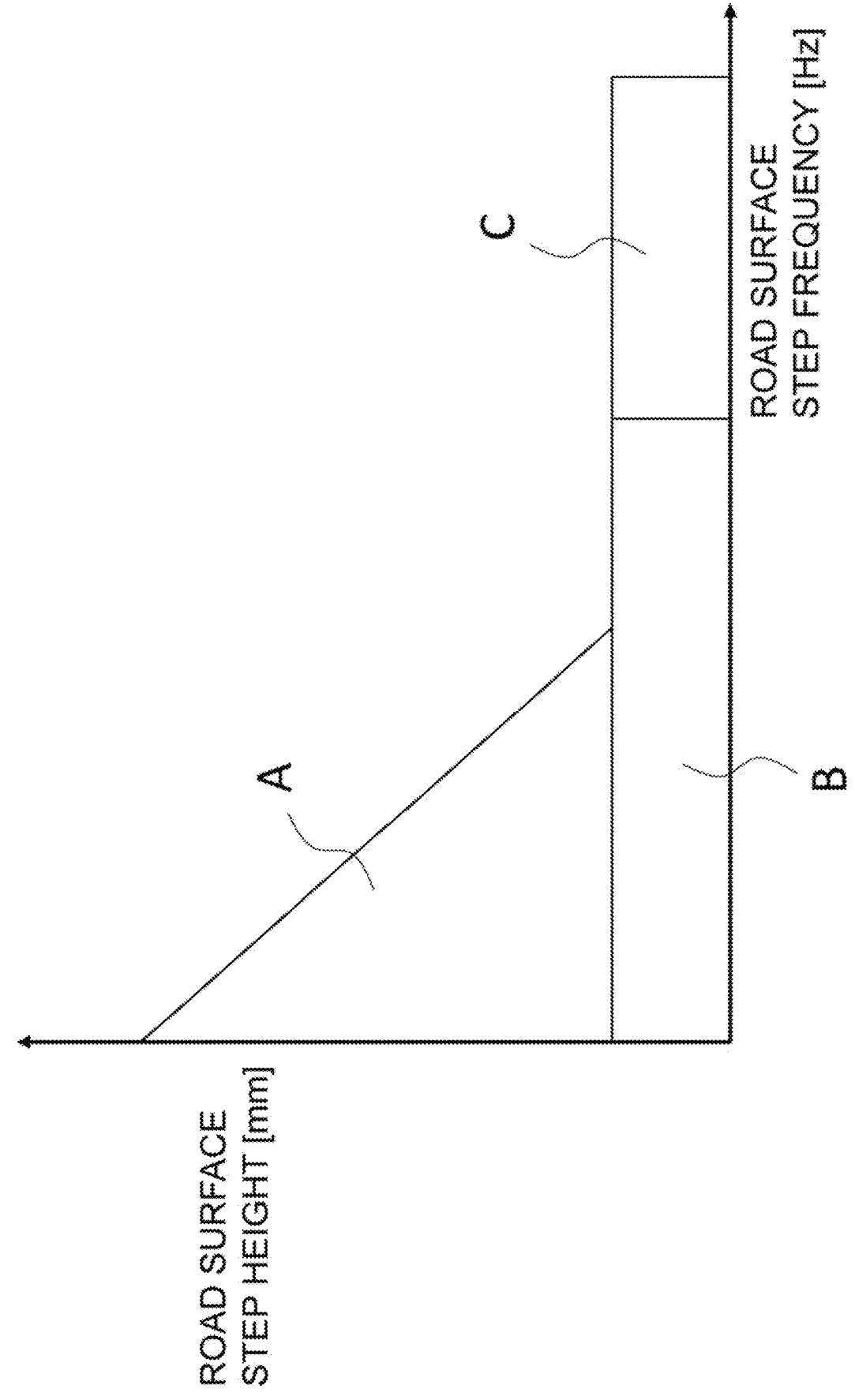
FIG. 4 is an explanatory diagram illustrating the division of a control area according to the road surface shape for switching of driving between an active suspension and a damper.
Figure 5:
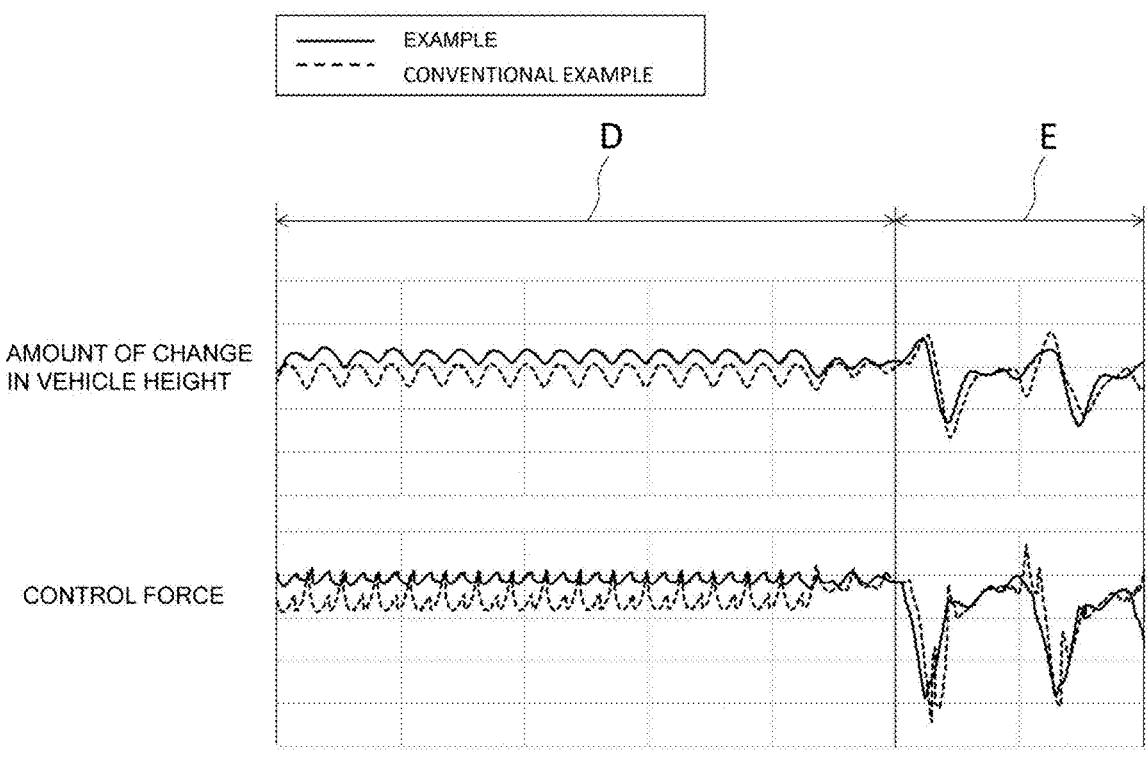
FIG. 5 is an explanatory diagram representing the oscillation suppression effect by a suspension control method according to an embodiment of the present invention.

FIG. 4 is an explanatory diagram illustrating the division of a control area according to the road surface shape for switching of driving between the active suspension 31 and the damper 32, and FIG. 5 is an explanatory diagram representing the oscillation suppression effect by a suspension control method according to an embodiment of the present invention.

In a first example, as illustrated in FIG. 4, the driving of the vehicle height adjustment actuator 31a and the variable damper actuator 32a is controlled according to the step height and step frequency of a road surface located directly below the wheels 2 during travelling estimated by the road surface shape estimation unit 43.

Specifically, when the step height of a road surface is high, and the step frequency of the road surface is low (an area A in FIG. 4), the actuator drive selection device 42 controls the changeover switch 55 so as to connect the signal sent from the vehicle height adjustment actuator control unit 52 to the vehicle height adjustment actuator 31a. In addition, the actuator drive selection device 42 disconnects the signal sent from the variable damper actuator control unit 62, and controls the changeover switch 65 so as to fix the damping force of the variable damper actuator 32a to a predetermined value.

When the step height of the road surface is high and the frequency is low as described above, only the vehicle height adjustment actuator 31a is variably driven, and the orientation of the vehicle body is maintained. At this time, since the damping force of the variable damper actuator 32a is fixed, the power consumption for driving the damper 32 can be suppressed.

In addition, as in a conventional suspension control method illustrated in FIG. 5, in a road surface with high step height and low step frequency (a range E in FIG. 5), when the adjustment of the vehicle height by the active suspension 31 and the adjustment of the damping force by the damper 32 are performed at the same time, there are cases where the direction of the force to be generated by the active suspension 31 and the direction of the force to be generated by the damper 32 conflict with each other, and at this time, there is a possibility that an increase in the amount of change in vehicle height occurs, and the ride comfort is deteriorated. As in the present example, by variably driving the vehicle height adjustment actuator 31a, and fixing the damping force of the variable damper actuator 32a to perform only the adjustment of the vehicle height by the active suspension 31, the increase in the amount of change in vehicle height can be suppressed, and the deterioration of the ride comfort can be prevented.

In addition, when the step height of a road surface is low, and the step frequency of the road surface is low (an area B in FIG. 4), the actuator drive selection device 42 disconnects the signal sent from the vehicle height adjustment actuator control unit 52, and controls the changeover switch 55 so as to fix the operation of the vehicle height adjustment actuator 31a. In addition, the actuator drive selection device 42 controls the changeover switch 65 so as to connect the signal sent from the variable damper actuator control unit 62 to the variable damper actuator 32a.

When the step height of the road surface is low, and the frequency is low as described above, only the variable damper actuator 32a is variably driven, and the orientation of the vehicle body is maintained. At this time, since the operation of the vehicle height adjustment actuator 31a is fixed, the power consumption for driving the active suspension 31 can be suppressed.

In addition, when the step height of a road surface is low, and the step frequency of the road surface is high (an area C in FIG. 4), the actuator drive selection device 42 disconnects the signal sent from the vehicle height adjustment actuator control unit 52, and controls the changeover switch 55 so as to fix the operation of the vehicle height adjustment actuator 31a. In addition, the actuator drive selection device 42 disconnects the signal sent from the variable damper actuator control unit 62, and controls the changeover switch 65 so as to fix the damping force of the variable damper actuator 32a to a predetermined value.

When the step height of a road surface is low, and the frequency is high as described above, by fixing the operation of the vehicle height adjustment actuator 31a, and fixing the damping force of the variable damper actuator 32a, the power consumption for driving the active suspension 31 and the damper 32 can be suppressed.

In addition, as in the conventional suspension control method illustrated in FIG. 5, in a road surface with low step height and high step frequency (a range D in FIG. 5), when the adjustment of the vehicle height by the active suspension 31 and the adjustment of the damping force by the damper 32 are performed at the same time, there is a possibility that the adjustment of the vehicle height cannot be performed at appropriate timing due to a response delay of the active suspension 31, the vehicle height becomes excessively low or the increase in the amount of change in vehicle height occurs, and the ride comfort is deteriorated. As in the present example, when travelling on a road surface on which the orientation of the vehicle body can be maintained only by the damping force of the damper 32, by fixing the operation of the vehicle height adjustment actuator 31a, making the damping force of the variable damper actuator 32a variable or fixed, and suppressing the vibration of the vehicle body only by the damping force of the damper 32, the increase in the amount of change in vehicle height can be suppressed, and the deterioration of the ride comfort can be prevented.

Second Example

Figure 6:
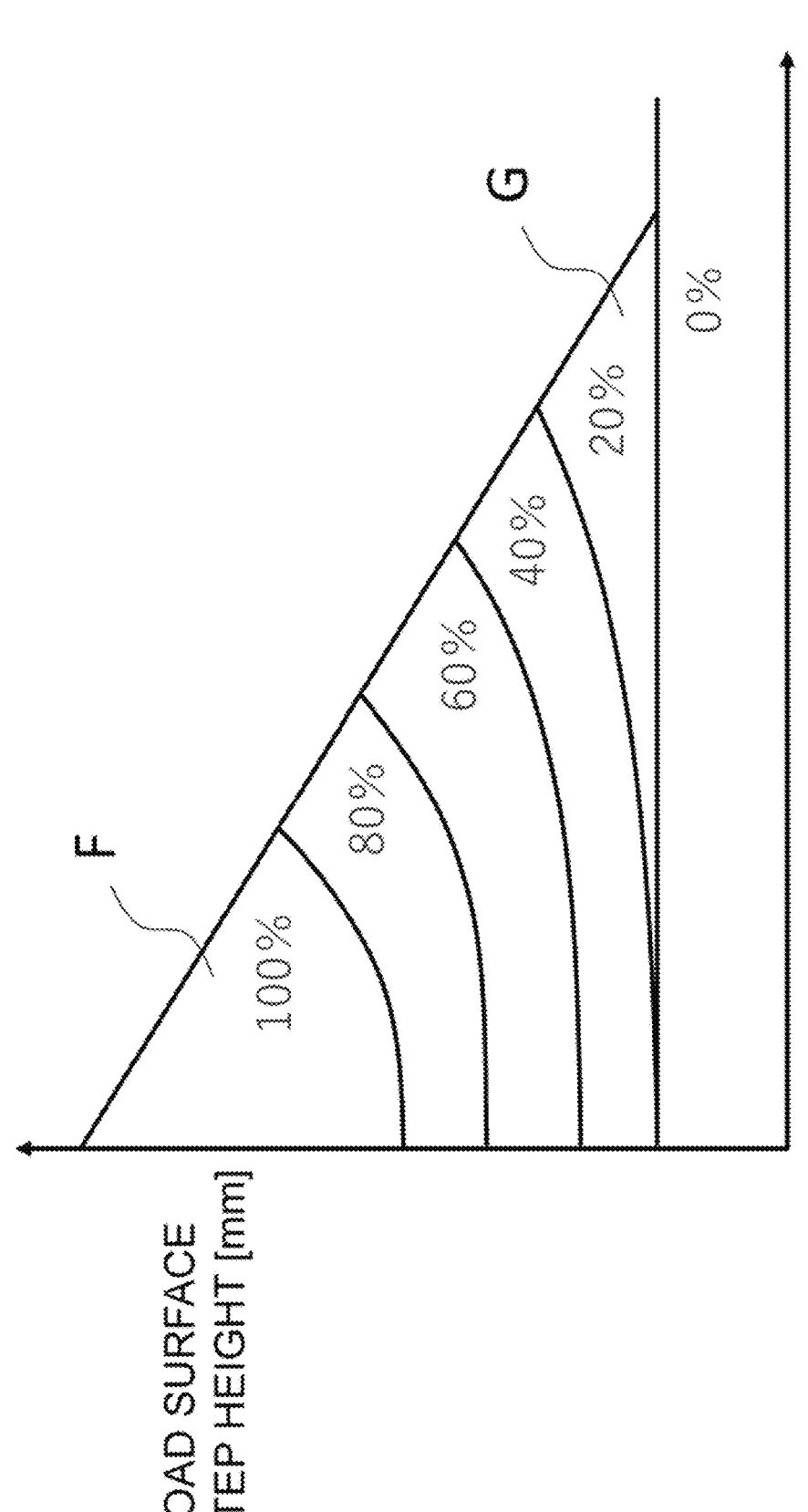
FIG. 6 is an explanatory diagram representing the drive ratio of the active suspension according to the road surface shape.
Figure 7:
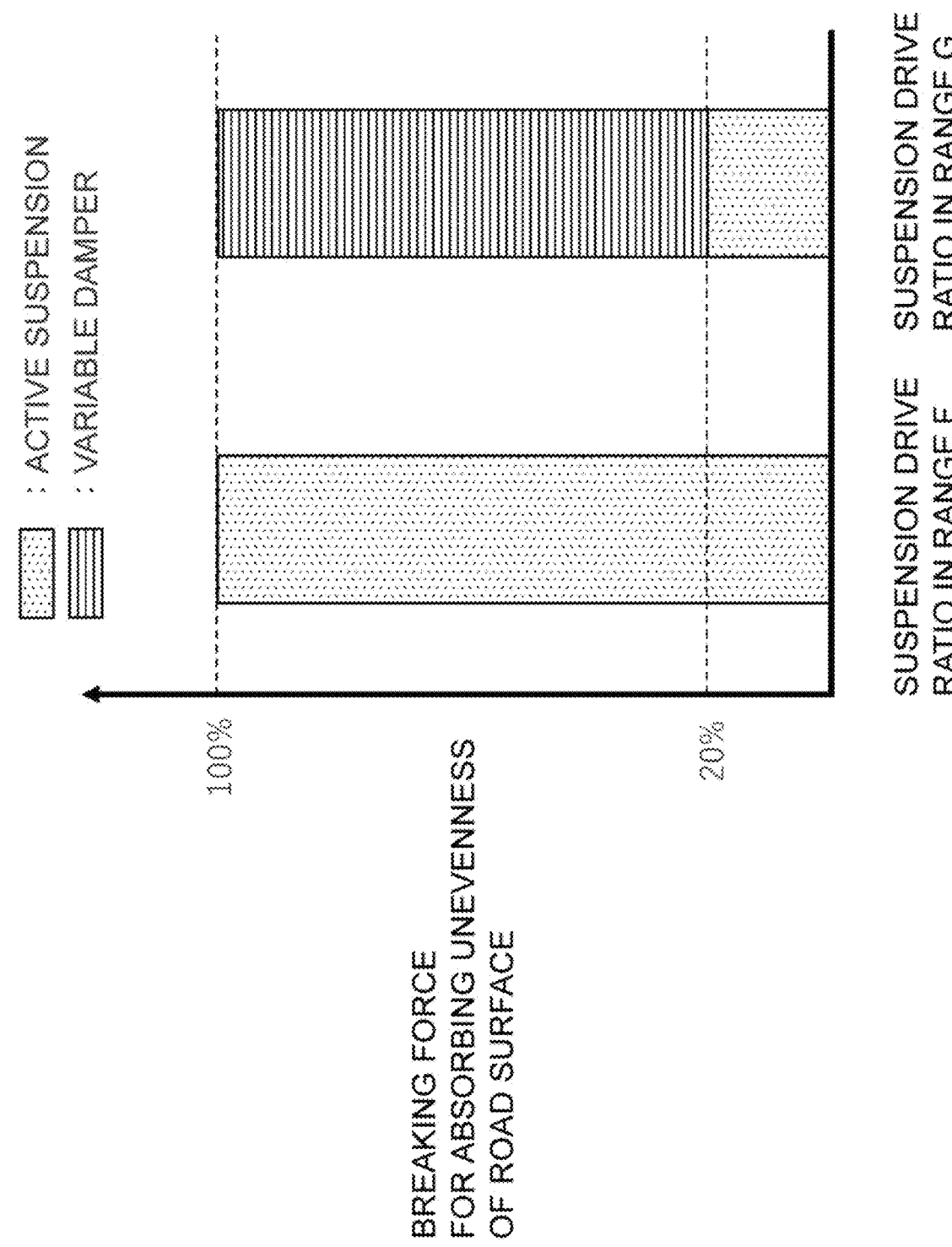
FIG. 7 is an explanatory diagram representing the drive ratio of the active suspension and the damper according to the road surface shape.

FIG. 6 is an explanatory diagram representing the drive ratio of the active suspension according to the road surface shape, and FIG. 7 is an explanatory diagram representing the drive ratio of the active suspension and the damper according to the road surface shape.

In the second example, as illustrated in FIG. 6, the ratio of driving the vehicle height adjustment actuator 31a and the variable damper actuator 32a is changed according to the step height and step frequency of a road surface located directly below the wheels 2 of the vehicle 1 during travelling estimated by the road surface shape estimation unit 43.

Specifically, when the step height of a road surface is high, and the step frequency of the road surface is low (an area F in FIG. 6), first, the actuator drive selection device 42 calculates the control force of the suspension device 3 required for maintaining the orientation of the vehicle body, based on the information on the road surface shape in front of the vehicle obtained by the front sensor 41. Next, the actuator drive selection device 42 controls the changeover switches 55 and 65 so that the signal sent from the vehicle height adjustment actuator control unit 52 is connected to the vehicle height adjustment actuator 31a, such that the control force of the active suspension 31 becomes 100% with respect to the required control force of the suspension device 3.

In the case where the vehicle 1 travels on the road surface with high step height and low step frequency as described above, as illustrated in FIG. 7, the actuator drive selection device 42 sends a signal to the changeover switches 55 and 65, drives the vehicle height adjustment actuator 31a, and fixes the damping force of the variable damper actuator 32a to be a predetermined value, so that 100% of the control force required for absorbing the unevenness of the road surface is the control force due to the damping force of the active suspension 31.

In addition, when the step height of a road surface is low, and the step frequency of the road surface is high (an area G in FIG. 6), first, the actuator drive selection device 42 calculates the control force of the suspension device 3 required for maintaining the orientation of the vehicle body, based on the information on the road surface shape in front of the vehicle obtained by the front sensor 41. Next, the actuator drive selection device 42 controls the changeover switch 55 so that the signal sent from the vehicle height adjustment actuator control unit 52 is connected to the vehicle height adjustment actuator 31a, so that the control force due to the damping force of the active suspension 31 becomes 20% with respect to the required control force of the suspension device 3, In addition, the actuator drive selection device 42 controls the changeover switch 65 so that the signal sent from the variable damper actuator control unit 62 is connected to the variable damper actuator 32a, so that the control force due to the damping force of the damper 32 becomes 80% with respect to the required control force of the suspension device 3.

When the vehicle 1 travels on the road surface with low step height and high step frequency as described above, as illustrated in FIG. 7, the actuator drive selection device 42 sends a signal to the changeover switches 55 and 65, and changes the ratio of driving the vehicle height adjustment actuator 31a and the ratio of driving the variable damper actuator 32a, so that 100% of the control force required for absorbing the unevenness of the road surface is the sum of the control force due to the damping force of the active suspension 31 and the control force due to the damping force of the damper 32.

In this manner, by using the active suspension 31 and the damper 32 at an appropriate ratio according to the shape of the road surface on which the vehicle 1 travels, it becomes possible to make use of the advantages of both the active suspension 31 excellent in maintaining the orientation of the vehicle body for a step having a high step height, and the damper 32 excellent in the oscillation suppression for a step having high step frequency in a well-balanced manner. In addition, since the active suspension 31 and the damper 32 can be driven so as to cause the minimum control force required for maintaining the orientation of the vehicle body according to the step of a road surface, the power consumption can be reduced.

Third Example

Figure 8:
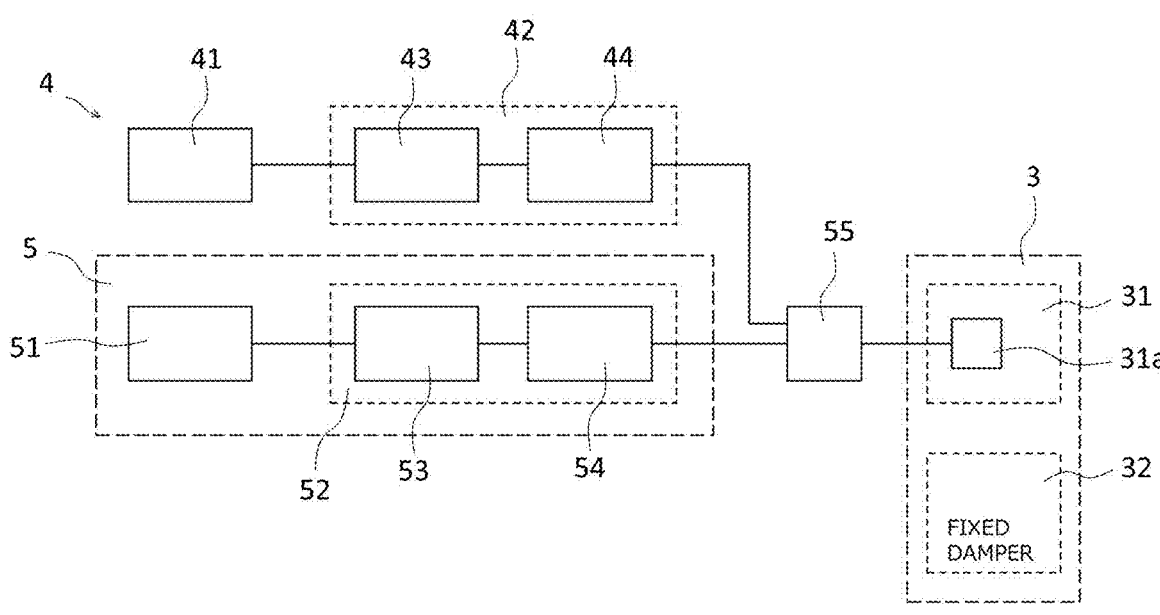
FIG. 8 is a block diagram illustrating the configuration of a suspension control apparatus according to a third example of the present invention.

FIG. 8 is a block diagram illustrating the configuration of a suspension control apparatus according to a third example of the present invention.

In the third example, as illustrated in FIG. 8, a description will be given of a case where the damper 32 is a fixed damper with constant damping force.

In the third example, when the step height of a road surface located directly below the wheels 2 during travelling estimated by the road surface shape estimation unit 43 is a height at which the orientation of the vehicle body cannot be maintained only by the fixed damper, the actuator drive selection device 42 controls the changeover switch 55 so as to connect the signal sent from the vehicle height adjustment actuator control unit 52 to the vehicle height adjustment actuator 31a. When the step height of the road surface estimated by the road surface shape estimation unit 43 is a height at which the orientation of the vehicle body can be maintained only by the fixed damper, the actuator drive selection device 42 disconnects the signal sent from the vehicle height adjustment actuator control unit 52, and controls the changeover switch 55 so as to fix the operation of the vehicle height adjustment actuator 31a.

In this manner, when travelling on a road surface with high step height by normally not driving the active suspension 31, and stabilizing the vehicle body only by the braking force of the fixed damper, the power consumption can be reduced by driving the active suspension 31 only when required.

Note that, in the above-described embodiment, although the case has been described where the suspension device 3 controlled by the suspension control apparatus 4 is the suspension device mounted on the vehicle, the suspension control apparatus and the suspension control method according to the present embodiment are not limited to this, and may control a suspension device mounted on a movable body, such as a small mobility vehicle and a delivery robot. It is clear from the language of the claims that modes with such changes or improvements may be included in the technical scope of the present invention.

REFERENCE SIGNS LIST 1 vehicle, 2 wheel, 3 suspension device, 4 suspension control apparatus, 5 actuator control device, 31 active suspension, 32 damper, 41 front sensor, 42 actuator drive selection device, 51 lower spring sensor, 61 upper spring sensor.

The invention claimed is:

1. A suspension control apparatus that controls a suspension device to be attached to wheels of a movable body, the suspension device consisting of an active suspension capable of adjusting a vehicle height, and a damper capable of adjusting a damping force, the suspension control apparatus comprising:

a road surface shape measurement device that obtains a road surface shape;

an actuator control device that controls driving of the suspension device; and an actuator drive selection device that distributes a drive ratio between the active suspension and the damper based on information obtained by the road surface shape measurement device, wherein the drive ratio is a ratio so that a sum of a control force due to a damping force of the active suspension and a control force due to a damping force of the damper is a control force that corresponds to unevenness of the road surface.

2. The suspension control apparatus according to claim 1, wherein the road surface shape measurement device measures height and frequency of unevenness of a road surface in front of the movable body.

3. The suspension control apparatus according to claim 2, wherein the actuator drive selection device determines driving of the active suspension and the damper based on information obtained by the road surface shape measurement device, and a preset correspondence between a road surface step frequency and a road surface step height.

4. The suspension control apparatus according to claim 1, wherein the actuator control device includes a road surface frequency measurement device that measures height and frequency of unevenness of a road surface received by the wheels; and an orientation information obtaining device that measures inclination of the movable body.

5. A suspension control method that controls a suspension device to be attached to wheels of a movable body, the suspension device consisting of an active suspension capable of adjusting a vehicle height, and a damper capable of adjusting a damping force, the suspension control method comprising:

a road surface shape measurement step of obtaining a road surface shape;

an actuator control step of controlling driving of the suspension device; and an actuator drive selection step of distributing a drive ratio between the active suspension and the damper based on information obtained by the road surface shape measurement step, wherein the drive ratio is a ratio so that a sum of a control force due to a damping force of the active suspension and a control force due to a damping force of the damper is a control force that corresponds to unevenness of the road surface.

6. The suspension control method according to claim 5, wherein the road surface shape measurement step measures height and frequency of unevenness of a road surface in front of the movable body.

7. The suspension control method according to claim 6, wherein the actuator drive selection step determines driving of the active suspension and the damper based on information obtained by the road surface shape measurement step, and a preset correspondence between a road surface step frequency and a road surface step height.

8. The suspension control method according to claim 5, wherein the actuator control step includes a road surface frequency measurement step of measuring frequency of unevenness of a road surface received by the wheels; and an orientation information obtaining step of measuring orientation of the movable body.

* * * * *